United States Patent [19]

Goeckler et al.

[11] Patent Number: 4,881,222

[45] Date of Patent: Nov. 14, 1989

[54] MULTICARRIER DEMODULATOR

[75] Inventors: Heinz Goeckler; Thomas Alberty, both of Backnang, Fed. Rep. of Germany

[73] Assignee: ANT Nachrichtentechnik GmbH, Backnang, Fed. Rep. of Germany

[21] Appl. No.: 164,465

[22] Filed: Mar. 4, 1988

[30] Foreign Application Priority Data

Mar. 12, 1987 [DE] Fed. Rep. of Germany ....... 3707960

[51] Int. Cl.$^4$ ...................... H04L 5/06; H04L 27/00; H04J 1/00
[52] U.S. Cl. .................................................. 370/70
[58] Field of Search ...................... 370/70, 123; 375/39

[56] References Cited

U.S. PATENT DOCUMENTS 3,906,347  9/1975  Motley et al. ......................... 375/39
4,785,447  11/1988  Ichiyoshi ............................... 370/70
4,792,943  12/1988  Gockler ................................. 370/70

Primary Examiner—Robert L. Griffin
Assistant Examiner—Melvin Marcelo
Attorney, Agent, or Firm—Spencer & Frank

[57] ABSTRACT

The present invention relates to a multicarrier demodulator for separating and demodulating a digitalized frequency multiplexed signal into a plurality (L) of individual channel signals, with the separation being performed using a frequency division demultiplexer (FDM). The separated channel signals are each filtered using bandwidth limitation filters and thereafter demodulated using a synchronous demodulator. Following demodulation, the signals are filtered by interpolation filters, data (Nyquist) filters, and subsequently decided upon in a decider. The invention is characterized by the fact that the demodulator operates upon a pair of phase displaced complex channel signals.

3 Claims, 5 Drawing Sheets

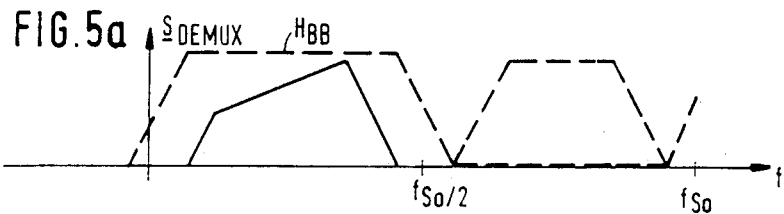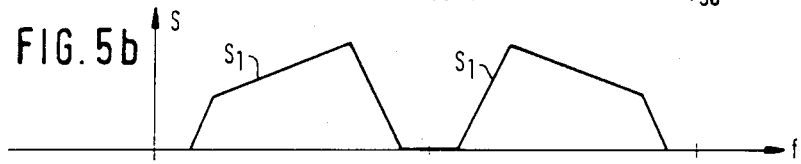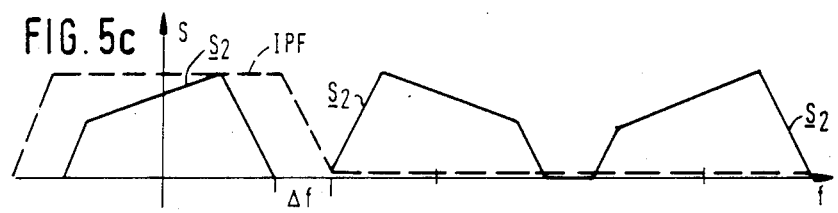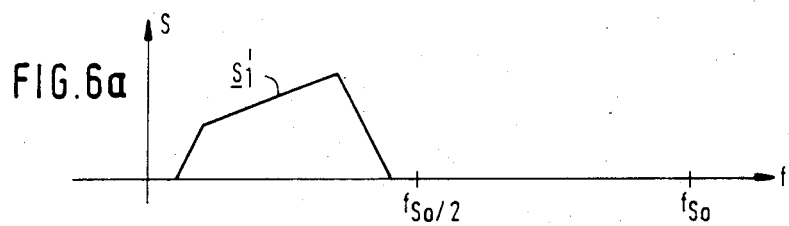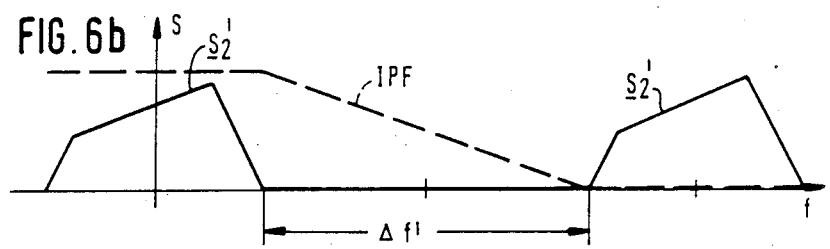

MULTICARRIER DEMODULATOR

BACKGROUND OF THE INVENTION

This invention relates to improvements in multicarrier demodulators of a type which are particularly useful in telecommunication systems employing satellite transmissions.

Multicarrier demodulators intended for use in satellite communication systems of the kind shown in FIG. 1 are well known. Referring to FIG. 1, various vehicles including aircraft 10, ships 11 and trucks 12 are interconnected with each other for radio communication via a satellite 13 and ground station 15. The satellite 13 receives uplink signals from one or more of the vehicles in the L band of frequencies, using a frequency division multiplexing mode (FDM), that includes up to 800 different channels. The satellite retransmits such data signals to the ground station 15 over the C band of frequencies using a time division multiplex (TDM) mode of transmission. From the ground station 15, the data is retransmitted to other ones of the mobile vehicles or stationary receivers.

The multicarrier demodulator of the present invention is employed as part of the transponder system aboard the satellite, as shown in block diagram form in FIG. 2. Referring to FIG. 2, the FDM uplink signal is received by the satellite antenna 18, is converted to a signal $S_{FDM}$ and passes to a first carrier frequency converter 19 having a reference signal generator 19a connected thereto. The converter signal $S_{IF}$ is passed through a filtering circuit 20 to a sampling circuit 21 and then to an analog-to-digital converter circuit 22, where the signal is digitalized as known in the art. After being digitalized, the signal is then passed to a frequency division demultiplexer 23, also known in the art, where the signal is separated into the digitalized signals for each of the many different channels 1 to L, inclusive. The digital separated signals for each channel are then demodulated by demodulator circuits 24a, 24b ... 24n for each channel. In the satellite transponder, all of the different data signals from the different channels are combined by a multiplexer 25 and processor 27 into a time division multiplexer mode, modulated at 28 and transmitted in the different multiplex mode and at the different frequency band, by the satellite transmitting antenna 29.

The requirements for the processing and demodulating of the different signals for the channels 1 to L are as follows. A high sampling rate of $f_{sI}=4LB$ at sampling circuit 21 is required in relation to the number of channels L and the bandwidth B. This is reduced to a sampling frequency of $f_{so}=2B$ for the individual output signals for the plural L channels. The desired signal spectrum at the output of the demultiplexer 23 should be present in a centered position around a center band frequency $f_m$ which is not equal to zero and has a bandwidth B. It does not matter if outside undesirable spectral frequency components are present that could interfere with the demodulation since they are filtered to suppress the undesired frequencies. For demodulation, the center band frequency $f_m$ must be zero, and circuitry is provided to shift this frequency to such zero center position.

The data stream to be recovered in the demodulator is clocked with a stepping clock pulse having a frequency $f_s$, with the sampling rate $f_{so}$ generally not being an integer multiple of $f_s$. Since however, the data must be transferred at the output of the different channel demodulators with the stepping clock pulse frequency, the output pulse sampling rate $f_{so}$ must be adapted at a suitable location to the stepping clock pulse. For this purpose, an interpolation filter is required. This filter is also necessary if the output sampling rate is $f_{so}=m\cdot f_s$, with m being a whole number, since the optimum sampling instant must be found in the demodulator with the aid of a clock pulse control loop to enable a subsequent decider to recover the data. This generally requires that further intermediate values be determined by interpolation between sampling values furnished by the demultiplexer at time intervals $T_{so}=1/f_{so}$.

Finally, it is necessary to provide in each data signal demodulator a pulse shaping filter for optimum suppression of the noise in the transmission path. This pulse shaping filter, which may be a Nyquist filter, must be optimally adapted to the transmitted signal.

In the prior art circuit of FIG. 3, the bandwidth limitation for each channel is obtained by the use of two filters 29 and 31 connected to the output of a demultiplexer 23. The outputs of the filters are added and subtracted at 33. Thus, the original pair of output signals 30a and 30b from demultiplexer 23 representing a complex-valued signal is temporarily reduced to one signal, a real-valued signal, before it is again split into a pair of phase displaced signals in the subsequent synchronous demodulator circuit.

The output signal of 33 is therefore multiplied with $\cos(2\pi k(f_m/f_{so})$ at 35, to shift the center frequency $f_m$ to zero, and then fed into the interpolation filter 43, where the timing adjustment is performed, and then fed into the pulse shaping filter 51 to yield the in-phase component which is fed into the decision circuitry 47.

In parallel the output signal of 33 is multiplied with $\sin(2\pi k(f_m/f_{so})$ at 36, then fed in the interpolation filter 46 and then fed into the pulse shaping filter 54, to yield the quadrature component which is fed into the decision circuit 47.

The decision circuit 47 decides which data was transmitted and can provide control signals for the timing adjustment 48 and for the center frequency 67.

The decision circuit itself is known in the art and not part of the present invention. Also the way in which the control signals 48 and 67 are generated is known in the art and not part of the present invention. Examples may be found in the publication John G. Proakis: Digital Communications, McGraw Hill, 1983, (FIG. 4.2.34 for control signal 67 and FIG. 4.2.41 for control signal 48).

Referring to FIG. 5a, there is shown the spectrum $S_{DEMUX}$ as a function of frequency f of the complex-valued output signal of the frequency division demultiplexer 23 of FIG. 3. In FIG. 5a, $H_{BB}$ is the frequency magnitude response of the filters 29, 31 with complex coefficients, from which only the real part of the output signal is further processed. In FIG. 5b, $S_1$ is the spectrum of the real-valued output signal of the filters 29, 37, and, in FIG. 5c, $S_2$ designates the spectrum of the complex-valued input signal of the interpolation filters IPF in the QAM demodulator. The interpolation filters have real coefficients, and are used twice for the real and imaginary parts of the time domain function corresponding to $S_2$.

It is seen from FIG. 5a, that only the desired signal spectrum (solid line in FIG. 5a) can pass the band limiting filter. Undesired signals within other frequency ranges are suppressed (dashed lines). In FIG. 5c additionally to the signal spectrum (solid lines) the transfer of function of the interpolation filters is shown (dashed line).

SUMMARY OF THE INVENTION

In accordance with the present invention, there is provided a multicarrier demodulator for the separation and demodulation of a digitalized frequency multiplex signal into a plurality of individual channel signals comprising a frequency division demultiplexer for receiving and separating a digitalized frequency multiplex signal, a plurality of bandwidth limitation filters for filtering the individual channel signals, a synchronous demodulator for synchronously demodulating the channel signals, a plurality of interpolation and Nyquist filters, and a decider circuit. The invention differs from prior art multicarrier demodulators in that a complex channel signal is fed to the synchronous demodulator. In one embodiment of the invention the filters have complex coefficients, and filtering takes place before the synchronous demodulator demodulates the channel signals.

In the present invention, the demultiplexed channel signals obtained from the demultiplexer of the transponder for each channel are derived in the form of two phase displaced (quadrature) streams of amplitude modulated pulses (QAM). Each of the demodulators for the different channels receives the two streams of phase displaced digitalized pulses and demodulate the data signal. The frequency division demultiplexer for receiving the sampled and digitalized pulses at its input and separating the different signal for each of the different channels into two streams of phase displaced pulses is known in the art and not part of the present invention.

It is an object of the present invention to provide a multicarrier demodulator of this type which has better system characteristics than conventional systems and at a reduced cost.

BRIEF DESCRIPTION OF THE DRAWINGS

FIGS. 5a, 5b and 5c are spectral diagrams in the frequency domain, generated by the prior art demodulator of FIG. 3.

FIGS. 6a and 6b are spectral diagrams similar to those of FIGS. 5b and 5c, respectively, generated by the present invention shown in FIG. 4.

DESCRIPTION OF THE PREFERRED EMBODIMENTS

Figure 1:
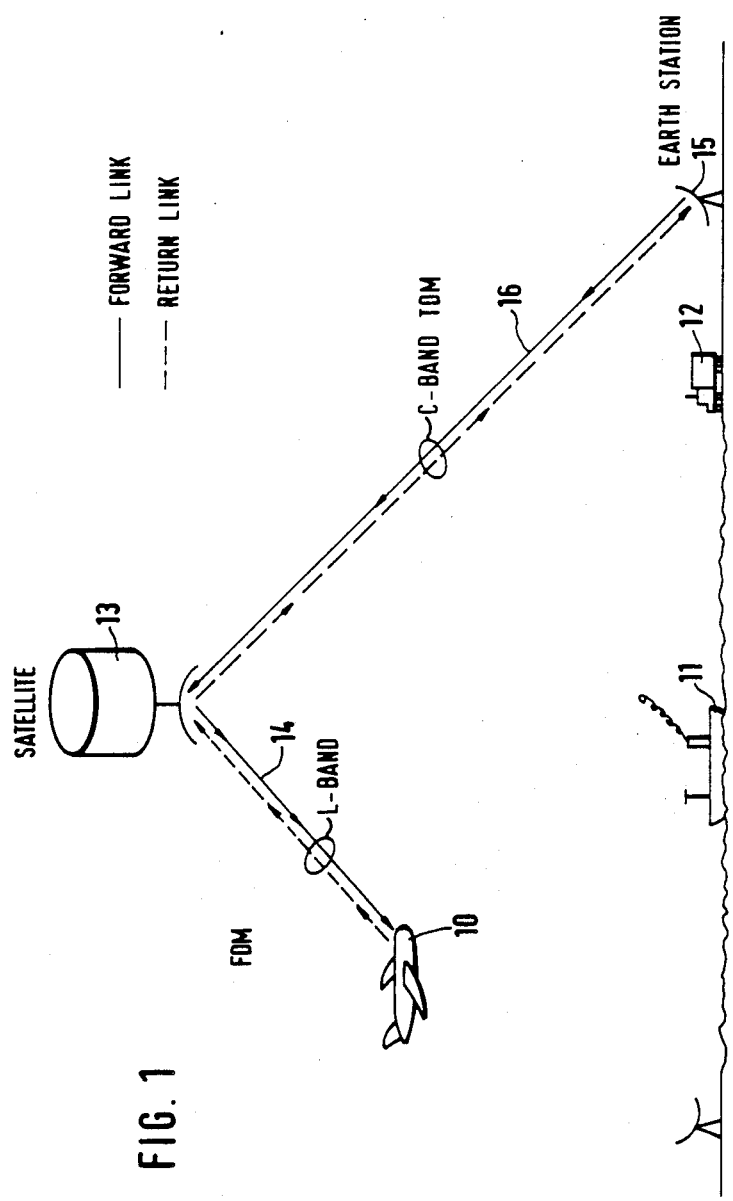
FIG. 1 illustrates a satellite communication system for reversible radio communication between aircraft and/or other vehicles and/or stationary facilities, using a satellite based radio transponder and ground station intermediate the vehicles and/or stationary facilities.
Figure 2:
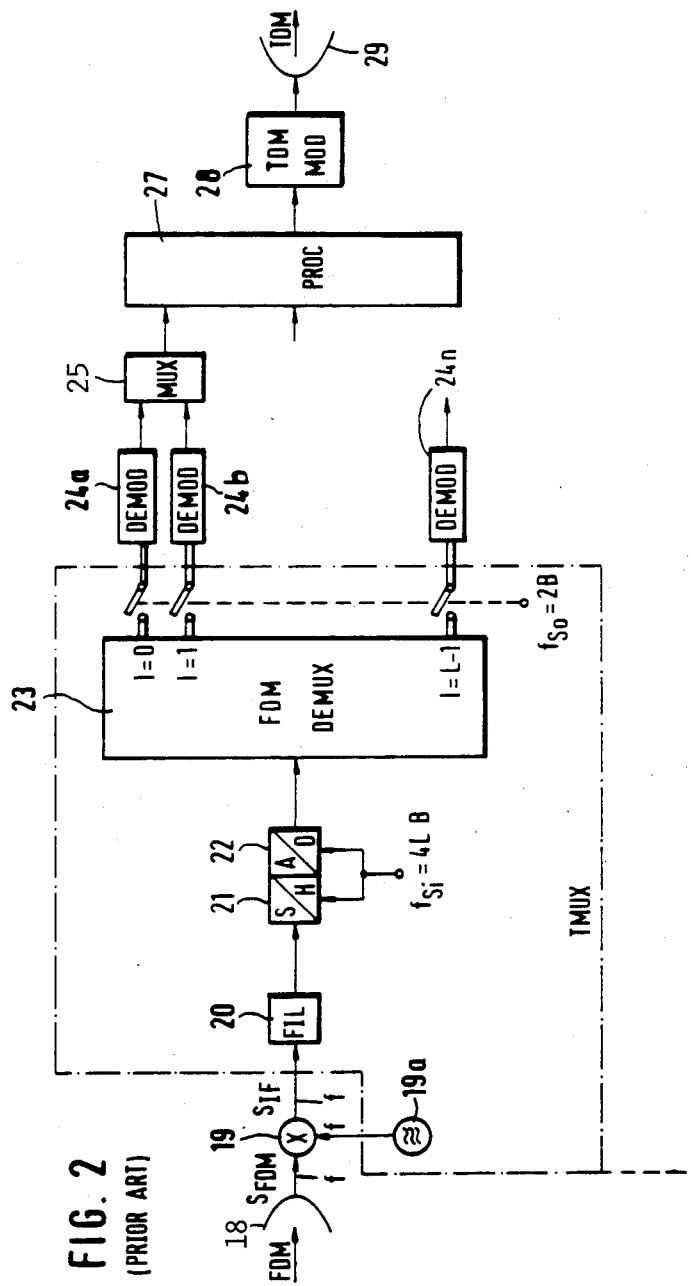
FIG. 2 is a block diagram showing the transponder in the satellite that receives radio signals in the L band from vehicles or facilities, in frequency division multiplex mode (FDM), and retransmits the signals in the C band, using time division multiplex mode (TDM) to a fixed ground station.

Referring again to the prior art system of FIG. 2, the incoming (uplink) frequency division multiplexed (FDM) radio signal is received by the satellite antenna 18 in analog form, and is passed through an initial frequency separator circuit 19 to separate the carrier signals for all of the channels. The plural carriers (L) are commonly filtered at 20, digitally sampled at 21, and then digitally converted to pulse code modulation form (PCM) at 22. The sampling rate is at four times the bandwidth of each of the channels 1 to L, multiplied by the number of channels L. Thus, after the analog to digital converter 22 there is generated a sequence of pulse code modulated pulses carrying the original FDM input signals for all of the L channels in a sampled and digitalized form.

Figure 4:
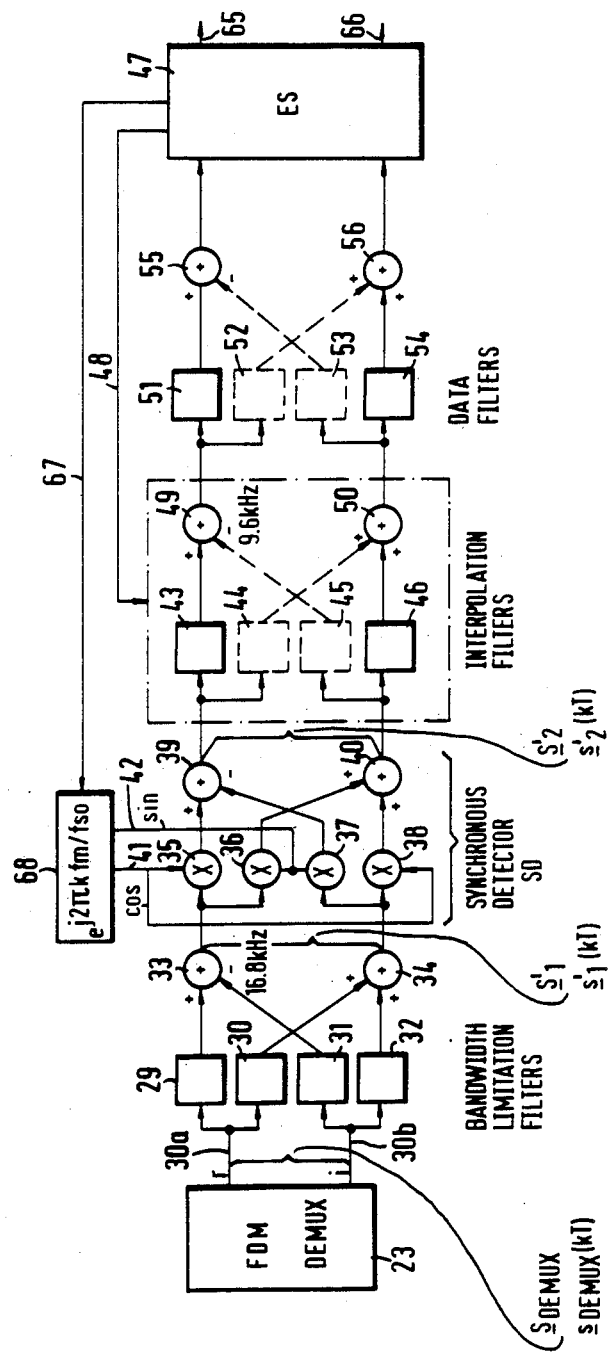
FIG. 4 is a circuit diagram in functional form showing a demodulator according to the present invention.

Referring now to FIG. 4 which is a circuit diagram of the present invention, the frequency division demultiplexer 23 receives the combined sequence of PCM pulses and separates this sequence into individual streams of such pulses for each of the plurality of different channels 1 to L, inclusive. For each channel, the demultiplexer 23 separates the digitalized signals into first and second quadrature displaced streams of PCM pulses over lines 30a and 30b. The first stream of pulses over line 30a are directed in parallel to a pair of bandwidth limitation filters 29 and 30; and the second stream of PCM pulses, which are phase displaced by 90 degrees with respect to the first stream of pulses, are directed in parallel over line 30b to bandwidth limitation filters 31 and 32.

The bandwidth limitation filters 29-32 have complex coefficients, that is, each has a complex-valued impulse response $$h_{BB} = h_r + jh_i,$$

where $h_r$ and $h_i$ are the real and imaginary components of the impulse response.

The input signal to each of the bandwidth limitation filters 29-32 from the frequency division demultiplexer 23 is a complex time domain signal $$S_{DEMUX}(kT) = S_r(kT) + jS_i(kT),$$

where kT is the sampling instant with T the spacing of the samples and k an integer, which permits numbering of the samples.

Filtering is performed by convolution, indicated by the symbol *, resulting in the complex-valued output signal or sequence $s_1'(kT)$ $$s_1'(kT) = S_{DEMUX}(kT) * h_{BB} = (S_r + jS_i) * (h_r + jh_i).$$

Accordingly,
$$s_1'(kT) = (S_r * h_r - S_i * h_i) + j(S_r * h_i + S_i * h_r),$$
where $(S_r * h_r - S_i * h_i)$ is the real part of the output and $(S_r * h_i + S_i * h_r)$ is the imaginary part of the output.

Thus the real part of the sequence $s_1'(kT)$ is obtained by passing the signal $S_r$ (30a) through the bandwidth limitation filter 29 with impulse response $h_r$ and subtracting from its output the output of the bandwidth limitation filter 31 with impulse response $h_i$ which is fed with the signal $S_i$ (30b).

The imaginary part of the sequence $s_1'(kT)$ is obtained by passing the signal $S_r$ (30a) through the bandwidth limitation filter 30 with impulse response $h_i$ and adding to its output the output of the bandwidth limitation filter 32 with impulse response $h_r$ which is fed with the signal $S_i$ (30b).

The filtered streams of pulses from quadrature displaced filter 29 and 31 are subtractively combined in adder 33; and the quadrature displaced streams of filtered pulses from filters 30 and 32 are additively combined in adder 34. The difference and sum PCM signals from adders 33 and 34 are obtained at the actual output sampling frequency, in this particular case: 16.8 kHz. The difference stream of pulses is directed to demodulators 35 and 36; and the sum stream of pulses are directed to demodulator 37 and 38. Demodulators 34-38 are components of a synchronous demodulator circuit SD that extracts the carrier signals, shifts the center frequency $f_m$ of the spectrum to zero and produces the envelopes at adders 39 and 40. Specifically, a difference signal is obtained at adder 39 and a sum signal is obtained at adder 40, after synchronous demodulation in a feedback loop.

The operation of the demodulator circuit SD can be understood by considering the bandwidth limitation filters 29, 32 and 30, 31 to have the transfer functions $$\cos 2\pi k f_m/f_{so} \text{ and } \sin 2\pi k f_m/f_{so},$$

respectively so that the filter blocks 29-32 operate as simple digital multipliers. Thus, as shown in FIG. 4, the incoming real and imaginary parts of the signal $s^1(kT)$ are multiplied by the PCM samples of $\cos 2\pi k f_m/f_{so}$ and $\sin 2\pi k f_m/f_{so}$. These two real carriers of frequency $f_m$ are combined to form a complex carrier $$e^{j2\pi k f_m/f_{so}} = \cos 2\pi k f_m/f_{so} + j \sin 2\pi k f_m/f_{so}$$

The difference signal at adder 39 is then directed to interpolation filters 43 and 44; and the demodulated sum signal is directed to interpolation filters 45 and 46 where their sampling frequencies are changed for instance to 9.6 kHz. If the demodulation frequency is selected to equal $f_m$, the filter function becomes symmetrical about $f=0$ and the additional interpolation filters 44 and 45 (shown by dashed lines) are not required.

The output of interpolation filter 43 (and 45 when used), and the output of filter 46 (and filter 44 when used) is connected to adders 49 and 50, respectively. Following interpolation the resulting sum and difference signals at adders 49 and 50 are directed to the data (Nyquist) filters 51, 52 and 53, 54, and to adders 55 and 56. As in the case of the interpolation filters, Nyquist filters 52 and 53 are not needed when the demodulation frequency is equal to $f_m$.

The outputs of adders 55 and 56 are coupled to a decider circuit 47 which controls feedback channels 48 and 67. Feedback channel 48 is connected directly to the interpolation filters 43-46, and feedback channel 67 is connected to the synchronous demodulator SD through a function generator 68 having the transfer characteristic $e^{j2\pi k f_m/f_{so}}$, which generates a sine signal for control of demodulator 36 and 37 and a cosine signal for control of demodulators 35 and 38.

The frequency $f_m$ is controlled via the feedback connection 67 such that the spectrum $S_2'$, as is explained below in connection with FIG. 6b, is centered at zero frequency. The feedback connection 48 from the decider circuit 47 to the interpolation filter circuit forces the interpolation filter to select the correct sampling instant out of a number of possibilities.

The decision circuit 47 decides which data was transmitted. In the case of a QPSk modulation the output signal 65 is therefore just the sign of the output signal of the adder 55. The output signal 66 is just the sign of the output signal of the adder 56.

A useful frequency control may be based in the case of a QPSk modulation on a four-phase Costas loop as described in F. M. Gardner: Phase Lock Techniques, John Wiley & Sons, 1979 FIG. 11.9.

Timing recoverys are also well known, and examples may be found in K. H. Mueller, M. Muller: Timing Recovery in Digital Synchronous Data Receivers, IEEE COM-24, No. 5, May 1976 and F. M. Gardner: A BPSk/QPSk Timing Error Detector for Sampled Receivers, IEEE COM-34, No. 4, May 1986.

Figure 3:
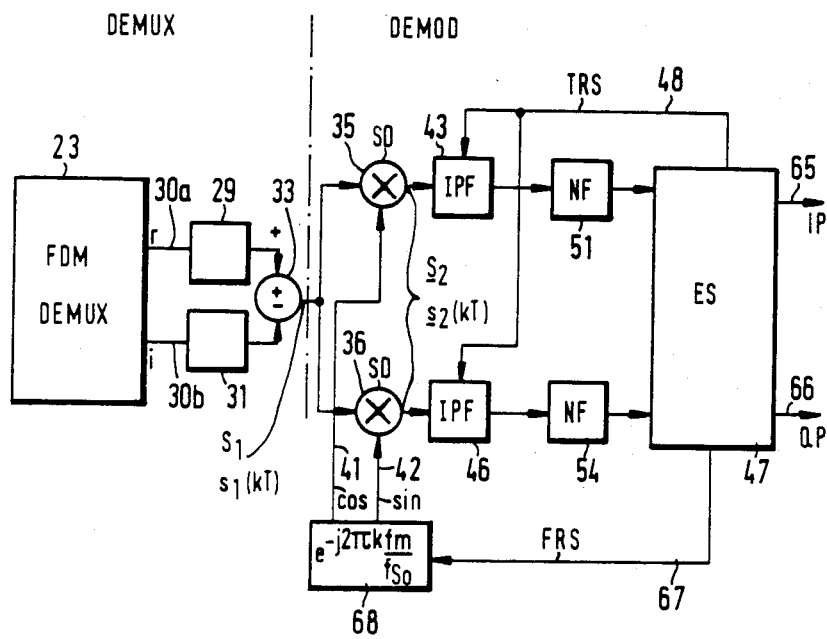
FIG. 3 is a block diagram showing a multicarrier demodulator, for each different channel, as used in the prior art.

The operation of the circuit of FIG. 4 can be further understood from a study of FIGS. 6a and 6b and a comparison of those figures with FIGS. 5b and 5c, respectively. In FIG. 6a, $S_1'$ is the spectrum of the complex-valued output signal of the filters 29-32 of FIG. 4, and in FIG. 6b, $S_2'$ is the spectrum of the complex-valued input signal of the interpolation filters 43-46. As in the circuit of FIG. 3, the interpolation filters have real coefficients and are used twice for the real and imaginary parts of the time domain function corresponding to $S_2'$.

Note that the spectrum $S_2'$ of the input signal to the IPF is just a shifted version of the spectrum $S_1'$. Compared to FIG. 5c there is no additional mirror spectrum that appears.

Compared to FIG. 5c the distance $\Delta f'$ between two repetitive spectrums is much greater. Thus, the filter degree of IPF according to FIG. 4 (FIG. 6c) is correspondingly smaller than in the case of the prior art.

Figure 7:
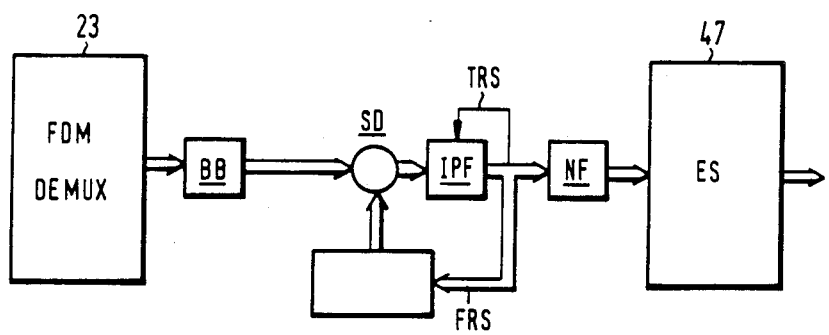
FIG. 7 is a simplified block diagram showing a different arrangement of components in the QAM demodulator portion of FIG. 4.

FIG. 7 shows a simplified diagram of a slightly modified structure compared to FIG. 4, where the output signal of the demultiplexer is fed into the bandwidth limitation filter, which output is fed into the synchronous demodulator, which output is fed into the interpolation filter, which output is fed into the pulse shaping filter, which output is fed into the decision circuit, but where control signals for the timing adjustment and frequency correction are obtained from the output signals of the interpolation filter before the pulse shaping is performed.

An example of a useful frequency control loop is in this case a loop with the quadricorrelator as frequency discriminator in conjunction with a PLL as described in David G. Messerschmitt, Frequency Detectors for PLL Acquisition in Timing and Carrier Recovery, IEEE COM-27, No. 9, Sept. 1979. An example for a useful timing loop is described in D. N. Godard: Passband Timing Recovery in all ALL Digital Modem Receiver, IEEE COM-26, No. 5, May 1978.

The present disclosure relates to the subject matter disclosed in Federal Republic of Germany Patent No. P 37 07 960.3 filed March 12th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a multicarrier demodulator for the separation and demodulation of a digitalized frequency multiplex signal into a plurality of individual channel signals comprising a frequency division demultiplexer for receiving and separating said digitalized frequency multiplex signal, a plurality of bandwidth limitation filters for filtering said individual separated channel signals, a synchronous demodulator for synchronously demodulating said individual separated and band-limited channel signals, a plurality of interpolation and Nyquist filters, and a decider circuit, wherein each of said individual separated and bandlimited channel signals is a complex signal and is fed to said synchronous demodulator.

2. A multicarrier demodulator as defined in claim 1 wherein said bandwidth limitation filters have complex coefficients.

3. A multicarrier demodulator for the separation and demodulation of a digitalized frequency multiplex signal into a plurality of individual channel signals comprising a frequency division demultiplexer for receiving and separating said digitalized frequency mutliplex signal;

a plurality of bandwidth limitation filters for filtering said individual channel signals, the output of said bandwidth limitation filters being a complex channel signal;

a synchronous demodulator for synchronously demodulating said complex channel signal;

a plurality of interpolation filters for filtering the output of said synchronous demodulator;

a plurality of Nyquist filters for filtering the output of said interpolation filters; and a decider circuit coupled to the output of said Nyquist filters, said decider circuit having feedback circuits connected to said synchronous demodulator and to said interpolation filters.

* * * * *